Patented July 8, 1941

2,248,480

UNITED STATES PATENT OFFICE 2,248,480

METHOD OF THICKENING LATEX AND COMPOSITION PRODUCED

Harold B. Morris, Somerset, Mass., assignor to The Firestone Tire & Rubber Company, Akron, Ohio, a corporation of Ohio No Drawing. Application August 19, 1938, Serial No. 225,774

7 Claims. (Cl. 260—741)

This invention relates to methods for thickening latex and the compositions so produced.

Heretofore latex has customarily been thickened by the addition of relatively large amounts of thickeners, such as Karaya gum, casein, starch, locust bean gum, or commercial thickeners, but these substances impart undesirable properties to the rubber article obtained from thickened latex, such as excessive moisture absorptive properties. Also, certain thickeners cause creaming, as well as thickening, of the latex and this action is undesirable.

The general object of this invention is to overcome the foregoing and other difficulties attendant the use of known thickening processes and to provide an uncomplicated, inexpensive method of thickening latex so that the rubber obtained therefrom has a minimum of undesirable substances therein.

The foregoing and other objects are achieved by deammoniating latex, which has been preserved with ammonia, and adding zinc oxide to the deammoniated latex. Then, after the mixture is allowed to stand for a few minutes, a small amount of a dispersion of a thickener, in this instance a protein, is admixed therewith. This produces a smooth, stable, viscous latex mixture. Other compounding ingredients may be added to the latex, if desired. Practice of the invention results in thickening the latex with the addition of a minimum amount of thickener thereto which is a feature of the invention and which differs it from all other known thickening processes.

In one specific instance the invention was practiced by adding 3½ parts of a 50% (aqueous) sulfur dispersion to 166 parts of 60% latex. The latex was preserved by ammonia which was originally present slightly in excess of .5% but which had been reduced to an ammonia content of eighteen hundredths of a per cent (.18%) prior to adding the sulfur thereto. Then I added 2½ parts of a 40% aqueous dispersion of zinc oxide and 1 part of a 50% aqueous dispersion of piperidinium penta-methylene dithiocarbamate. The resulting mixture was permitted to stand for several minutes after which 10 parts of a 10% aqueous solution of casein was added and the mixture thickened rapidly to form a smooth, stable, viscous latex paste which was over five times as viscous as the original latex. This pasty mixture did not cream upon standing. In this example it will be seen that, in solid weight, the ingredients were approximately 100 parts of rubber, 1.75 parts sulfur, 1 part zinc oxide, 1 part casein, and one-half part accelerator.

It has been found that in practicing the invention with ammonia-preserved latex, the ammonia content must be reduced below the amount normally required to preserve latex. Zinc oxide may be used in any desired amount, by dry weight, from about .1 to 10 parts and certain other suitable fillers, such as zinc carbonate, magnesium oxide, and soluble calcium or zinc salts may be substituted for the zinc oxide. Other similar proteins such as a gelatin solution may be used in place of the casein, when desired. It is thought that the protein used reacts with the metal salt to form a metallic proteinate that produces the desired thickening.

Experiments have shown that the desired thickening is secured only when both casein and zinc oxide, or their equivalents, are added to the deammoniated latex and that the other ingredients present have no thickening action.

It will be observed that the present invention satisfactorily thickens latex by the use of only about 1 part of thickening material, whereas such ingredients had commonly been used in greater concentrations prior to the present invention in order to secure satisfactory thickening. That is, the invention secures the same result by use of smaller amounts of thickening agent whereby the resultant rubber obtained contains a smaller amount of impurities than that of the prior art. Heretofore small amounts of casein have been added to latex but the only action desired, and secured, by that amount of casein previously has been to stabilize the latex and not to thicken it to the extent secured by the present invention.

In accordance with the patent statutes, I have completely disclosed and explained an embodiment of the invention. However it will be understood that various modifications can be made without departing from the scope of the invention as defined in the appended claims.

What is claimed is:

1. That method of thickening ammonia-preserved latex comprising the steps of reducing the ammonia content of the latex to less than .5%, adding up to 10% of zinc oxide to the deammoniated latex, allowing the latex mixture to stand for several minutes, and admixing about 1% of casein to the latex mixture to thicken it quickly to a smooth stable viscous paste.

2. That method of thickening ammonia-preserved latex comprising the steps of reducing the ammonia content of the latex to about .18%, adding up to 10% of zinc oxide to the deammoniated latex, allowing the latex mixture to stand for several minutes, and admixing about 1% of casein to the latex mixture to thicken it quickly to a smooth stable viscous paste.

3. That method of thickening ammonia-preserved latex comprising the steps of reducing the ammonia content of the latex to about .18%, adding zinc oxide to the deammoniated latex, and admixing about 1% of casein to the latex mixture to thicken it to a viscous liquid.

4. That method of thickening ammonia-preserved latex comprising the steps of reducing the ammonia content of the latex to about 18%, adding zinc oxide to the deammoniated latex, allowing the latex mixture to stand for a short period, and admixing a small amount of casein to the latex mixture to thicken it quickly to a viscous liquid.

5. That method of thickening latex containing substantially less than .5% ammonia comprising the steps of mixing zinc oxide with the latex, and then admixing a small amount of casein into the latex to form a viscous latex composition.

6. A thickened latex composition comprising about 166 parts of 60% latex having about .18% of ammonia therein and being at least five times as viscous as it was originally, about 1 part of zinc oxide, about 1 part of casein and compounding ingredients, which latex composition does not cream upon standing.

7. A thickened latex composition comprising latex having about .18% of ammonia therein and being at least five times a viscous as it was originally, a small quantity of zinc oxide, and a small quantity of casein and compounding ingredients, which latex composition does not cream upon standing.

HAROLD B. MORRIS.